W. R. PARK.
Regulating Cock.

No. 201,699. Patented March 26, 1878.

Witnesses. Inventor.

UNITED STATES PATENT OFFICE.

WILLIAM R. PARK, OF BOSTON, MASSACHUSETTS.

IMPROVEMENT IN REGULATING-COCKS.

Specification forming part of Letters Patent No. 201,699, dated March 26, 1878; application filed September 8, 1877.

*To all whom it may concern:*

Be it known that I, WILLIAM R. PARK, of Boston, in the county of Suffolk and State of Massachusetts, have invented an Improved Regulating or Lazy Cock, of which the following is a specification:

My invention relates to an improvement in cocks used in connection with inspirators or injectors; and the object is to regulate the supply of water, and at the same time prevent the possibility of the admission of air to the inspirator, the result of the presence of air being that when it comes in contact with the steam it becomes heated and expanded to such an extent as to destroy the operation of the machine.

The cock is arranged within the supply-pipe between the tank of the locomotive and the inspirator, and below the bottom of the water in the tank. By means of a crank and rod connected with the plug-stem the device is brought under the control of the engineer, and operated in the same manner as those now used for regulating the supply of water to the pump, and known among locomotive engineers as the "lazy-cock."

Figure 1:
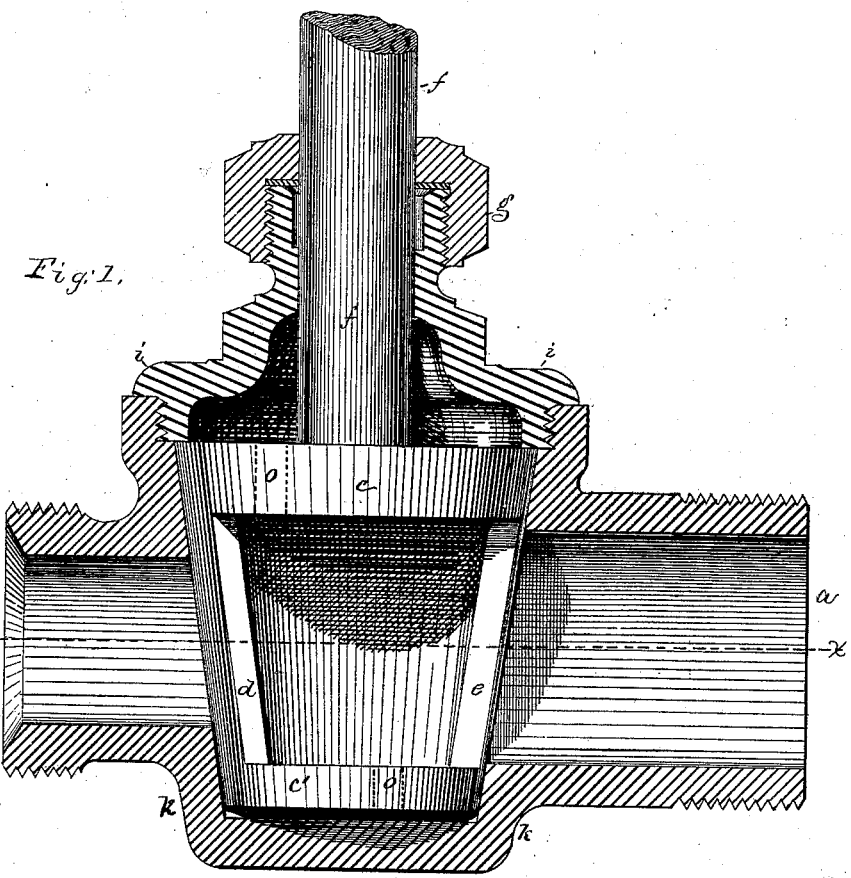
Figure 2:
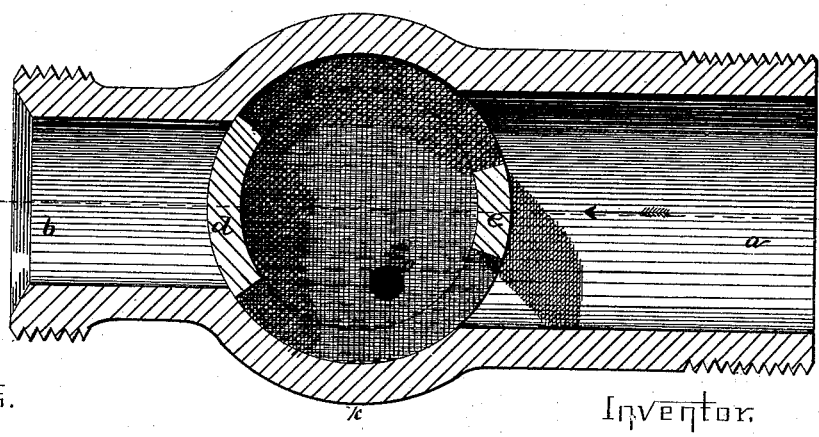

Referring to the drawings, Figure 1 is a longitudinal vertical section of my invention, showing the plug in elevation. Fig. 2 is a horizontal section of same, taken on the line $x \ x$, Fig. 1.

$a$ is the pipe that leads to the supply-tank, and $b$ the pipe leading to the inspirator. $c \ c'$ is the plug, fitted snugly within the casing $k$. The portion $d$ connecting the two heads of the plug is made sufficiently wide to fully cover the opening to the pipe $b$, the rear connection $e$ being simply to aid in supporting or strengthening the plug. Through the top and bottom heads of the plug are holes $o \ o$, and above the upper head and below the lower one a space is left, into which water passes through the holes $o$, thus allowing the water to cover all the parts or joints exposed to the action of the vacuum induced by the inspirator.

The diameter of the pipe $a$ and its connections with the tank is much greater than that of the pipe $b$ that connects with the inspirator, so as to always insure a larger supply of water than could be drawn through tube $b$, and to keep the joints covered with water and thus prevent the entrance of air into the cock.

The plug $c \ c'$ is attached to the spindle or stem $f$, the top of which is to be attached to a connecting-rod.

The casing $k$, which incloses the plug, is surmounted by a screw-cap, $i$, in the upper portion of which is a stuffing-box and nut, $g$.

What I claim as my invention is—

1. A regulating-cock so constructed and connected with an enlarged supply-pipe and a diminished discharge-pipe that the water in the cock will completely cover all the joints and exposed portions of the plug, so as to prevent the admission of air to the discharge-pipe, substantially as set forth.

2. A regulating-cock, consisting of a plug having its upper and lower heads $c \ c'$ perforated, and provided with the gate $d$ and post or support $e$, and fitted within the enlargement of a water-pipe, substantially as and for the purpose set forth.

3. The plug $c \ c'$, constructed as described, in combination with the enlarged supply-pipe $a$ and diminished discharge-pipe $b$ and the spaces or chambers above and below the plug, substantially as and for the purpose specified.

In testimony whereof I have signed my name to this specification in the presence of two subscribing witnesses.

WM. R. PARK.

Witnesses:
J. H. ADAMS,
B. H. WARREN.